United States Patent [19]

Salmond

[11] 3,915,976

[45] Oct. 28, 1975

[54] SUBSTITUTED-4-PHENYL-5H-CYCLOALKANO(D)PYRIMIDINES

[75] Inventor: William G. Salmond, Mount Arlington, N.J.

[73] Assignee: Sandoz, Inc., E. Hanover, N.J.

[22] Filed: Sept. 1, 1972

[21] Appl. No.: 285,672

[52] U.S. Cl... 260/251 A; 260/256.4 Q; 260/566 R; 424/251

[51] Int. Cl.².......................................... C07D 51/46

[58] Field of Search.................. 260/251 A, 256.4 Q

[56] References Cited

UNITED STATES PATENTS

| | | | |
|---|---|---|---|
| 3,305,553 | 2/1967 | Hoefle et al. | 260/256.4 |
| 3,560,501 | 2/1971 | Walker | 260/251 |
| 3,757,017 | 9/1973 | Mathieu | 260/247.5 B |

*Primary Examiner*—G. Thomas Todd
*Attorney, Agent, or Firm*—Gerald D. Sharkin; Richard E. Vila

[57] ABSTRACT

Substituted-4-phenyl-5H-cycloalkano[d]pyrimidines e.g., 6,7,8,9-tetrahydro-2-(4'-methyl-1'-piperazyl)-4-phenyl-5H-cyclopenta[d]pyrimidine, are prepared by treating a corresponding 2-halo-substituted-4-phenyl-5H-cycloalkano[d]pyrimidine with an amine and are useful as anti-inflammatory agents.

5 Claims, No Drawings

SUBSTITUTED-4-PHENYL-5H-CYCLOALKANO(D)PYRIMIDINES

This invention relates to substituted-4-phenyl-5H-cycloalkano [d] pyrimidines, which exhibit anti-inflammatory activity. In particular, it relates to substituted-4-phenyl-5H-cycloalkano[d]pyramidines, pharmaceutically acceptable salts thereof, their preparation and intermediates therefor.

The compounds of this invention may be represented by the formula

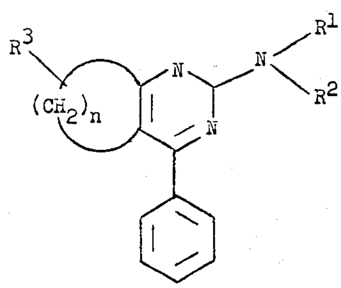

(I)

where $R^1$ and $R^2$ each represent hydrogen, lower alkyl, i.e. alkyl having 1 to 4 carbon atoms, e.g., methyl, ethyl, isopropyl and the like or when $R^1$ is hydrogen, $R^2$ may be lower cycloalkyl, i.e. cycloalkyl having 3 to 6 carbon atoms, e.g., cyclopropyl, cyclobutyl and the like or $R^1$ and $R^2$ together with N represent

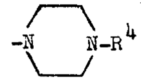

where $R^4$ represents lower alkyl, i.e., alkyl having 1 to 4 carbon atoms, e.g., methyl, ethyl, isopropyl and the like;

$R^3$ represents hydrogen or lower alkyl as defined above, and $n$ represents 3, 4, 5 or 6 and pharmaceutically acceptable acid addition salts thereof.

The compounds of formula (I) are prepared in accordance with the following reaction scheme:

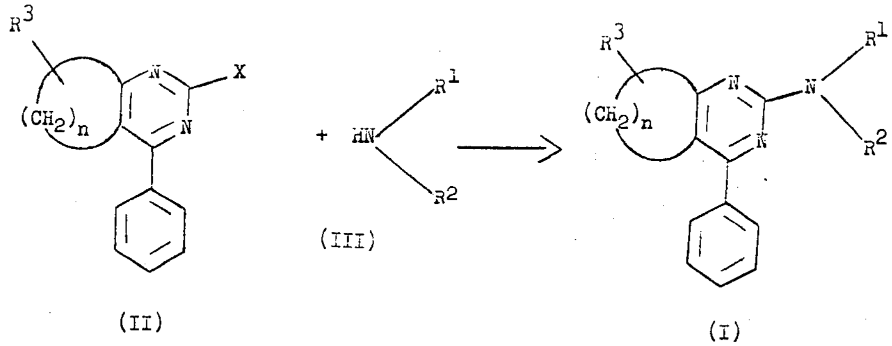

where $n$, $R^1$, $R^2$ and $R^3$ are as set out above, and

X is halo having an atomic weight of about 35 to 80.

The compounds of formula (I) are prepared by treating a compound of formula (II) with an amine of formula (III) in an inert organic solvent. Although the particular solvent used is not critical, the aromatic hydrocarbons such as benzene, toluene or xylene and ethers such as dioxane are preferred. The reaction can also be carried out in the presence of an excess of the amine as solvent. The temperature of the reaction is not critical, but it is preferred that the process be carried out at temperatures between about 20° to 160°C, conveniently at reflux of system. For low boiling point amines, e.g. ammonia, dimethylamine, isopropyl amine, and cyclopropylamine, they are maintained under pressure at temperatures of 20°–100°C. For optimum results, the reaction is run for about 0.25 to 48 hours, preferably 0.5 to 2 hours. The compound of formula (I) may be recovered using conventional techniques such as crystallization.

The compounds of formula (II) are prepared according to the following reaction scheme:

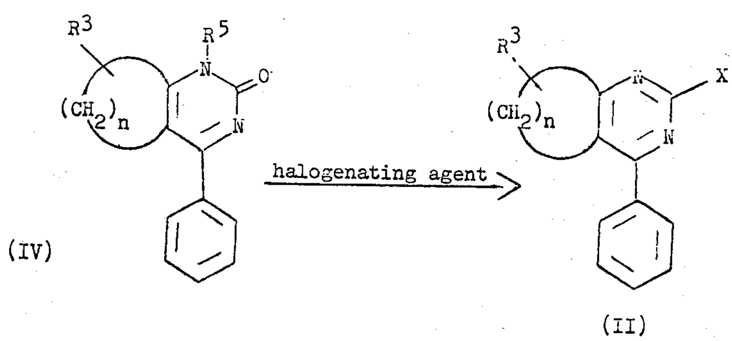

where, $n$, X and $R^3$ are as set out above and $R^5$ is lower alkyl as set out above.

The compounds of formula (II) are prepared by treating a compound of formula (IV) with an halogenating agent, e.g, phosphorous pentachloride thionyl chloride, thionyl bromide, or phosphorous oxychloride, the latter being especially preferred. A solvent is not required in this reaction, and it is preferred that the reaction be carried out in the presence of an excess of the halogenating agent employed. The temperature of the reaction is not critical, but it is preferred that the process be carried out at temperatures between about 20° to 160°C, conveniently at the reflux temperature of the system. For optimum results, the reaction is run for about 1 to 4 hours. The compounds of formula (II) may be recovered using conventional techniques e.g., crystallization.

The compounds of formula (IV) are prepared according to the following reactions scheme:

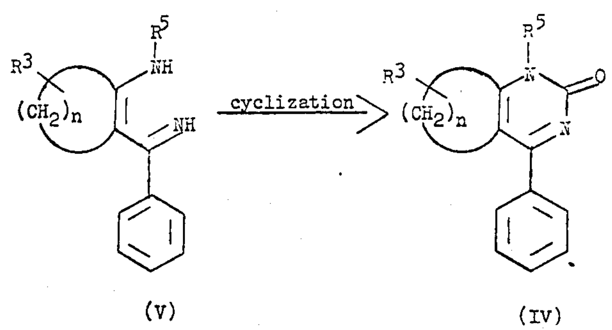

where $n$, $R^3$ and $R^5$ are as set out above.

The compounds of formula (IV) are prepared by cyclizing a compound of the formula (V) with phosgene in the presence of an inert organic solvent. Although the particular solvent used is not critical, solvents which may be used are aromatic hydrocarbons such as benzene, toluene and the like or the tri-lower alkyl substituted amines such as trimethylamine, or triethylamine, or a mixture thereof. The mole ratio of phosgene to the compound of formula (V) is not critical, but a substantial excess of the phosgene is preferably employed. The temperature of the reaction is not critical, but it is preferred that the process be carried out at temperatures between about −30° to +50°C, especially −10 to 5°C. For optimum results the reaction is run for about 30 minutes to 10 hours, preferably from 1 to 4 hours. The compounds of formula (IV) may be recovered using conventional techniques such as crystallization.

The compounds of formula (V) are prepared according to the following reaction scheme:

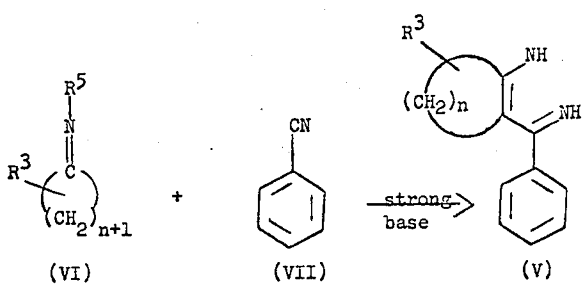

where $n$, $R^3$ and $R^5$ are as set out above.

The compounds of formula (V) are prepared by reacting a compound of formula (VI) with benzonitrile in the presence of a strong base and an inert organic solvent. Suitable strong bases are those which are capable of removing a hydrogen atom from the methylene group in the cycloalkane ring adjacent to the imine function of compound (VI). They include the alkali metal salts, especially the lithium salt, of secondary amines such as diethylamine, dimethylamine and diisopropylamine, as well as other bases such as methyl magnesium iodide. Although the particular solvent used is not critical, the aromatic hydrocarbons such as benzene, toluene and the like are preferred, especially benzene. The temperature of this reaction is not critical, but it is preferred that the process be carried out at temperatures between about −30° to +50°C. especially −10° to +5°C. For optimum results, the reaction is run for about 5 to 60 minutes, preferably 10 to 20 minutes. The compounds of formula (V) may be recovered using conventional techniques, e.g., recrystallization.

The compounds of formula (VI) are prepared in accordance with the following reaction scheme:

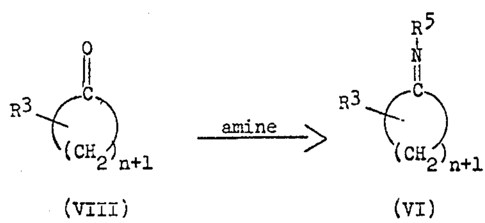

where $n$, $R^3$ and $R^5$ are as set out above. The compounds of formula (VI) are prepared by treating a compound of formula (VIII) with an amine using standard techniques.

Certain of the compounds of formula (VIII) are known and may be prepared by methods described in the literature. The compounds of formula (VIII) not specifically disclosed may be prepared by analogous methods from known starting materials.

The compounds of formula (I) are useful because they possess pharmacological activity in animals. In particular, the compounds of formula (I) are useful as anti-inflammatory agents, as indicated by their activity in rats dosed orally with 46 to 100 mg./kg. of the compound using the acute carrageenan-induced edema procedure substantially as described by Winter (Proc. Soc. Exptl. Biol, 111:544, 1962) or as indicated by plethysmographic measurement of food volumes on mature Lewis Strain rats made arthritic by a single 0.1 ml. injection of complete Freunds Adjuvant and dosed orally for 14 days with the compound of formula (I) at a daily dosage rate of 25–50 mg/kg.

For such usage, the compounds of formula (I) may be combined with a pharmaceutically acceptable carrier or adjuvant, and may be administered orally in such forms as tablets, capsules, elixers, suspensions and the like, or parenterally in the form of an injectable solution or suspension.

Furthermore, the compounds of formula (I) may be similarly administered in the form of their non-toxic pharmaceutically acceptable acid addition salts. Such salts possess the same order of activity as the free base, and are readily prepared by reacting the base with an appropriate acid and accordingly are included within the scope of the invention. Representative of the acid addition salts are the mineral acid salts, such as the hydrochloride, hydrobromide, sulfate, phosphate and the like and the organic acid salts, such as the succinate, benzoate, acetate, p-toluenesulfonate, benzenesulfonate, and the like.

The anti-inflammatory effective dosage of the compounds of formula (I) will depend on the particular compound employed, the method of administration and the severity of the condition being treated. In general, satisfactory results are obtained when these compounds are administered in the treatment of inflammation at a daily dosage of about 2 milligrams to about 200 milligrams per kilogram of animal body weight, preferably orally. This daily dosage is preferably administered 2 to 4 times a day, or in sustained release form. For most large mammals, such as primates, the total daily dosage is from about 150 milligrams to about 3000 milligrams. Dosage forms suitable for internal use comprise from about 37.5 milligrams to about 1500 milligrams of the active compound in intimate admixture with a solid or liquid pharamaceutically acceptable carrier or diluent.

A representative formulation suitable for oral administration 2 to 4 times a day in the treatment of inflammation is a capsule prepared by standard encapsulating techniques which contains the following:

| Ingredients | Weight (mg). |
|---|---|
| 6,7,8,9-tetrahydro-2-(4'-methyl-1'-piperazyl)-4-phenyl-5H-cyclopenta[d]pyrimidine. | 100 |
| Inert solid diluent (starch, lactose, kaolin). | 200 |

EXAMPLE 1

Part A:

1-isopropyl-4-phenyl-1,5,6,7,8,9-hexahydrocyclohepta[d]pyrimidin-2-one.

To a mixture of 200 g. of cycloheptanone and 300 ml isopropylamine there is added 150 mg. of *Linde type 3A molecular sieves. The mixture is warmed for about 30 hours after which it is allowed to stand overnight. The *Linde type 3A molecular sieves is removed by filtration, followed by distillation of the filtrate to give isopropylimino cycloheptane.

*Division of American Cyanamid Corporation.

To a solution of 30.3 g. of diisopropylamine in 300 ml. benzene there is added 94.0 ml. of a 1.6 normal solution of n-butyllithium in hexane. After fifteen minutes, 46.0 g. of isopropylimino cycloheptane is added and after 10 minutes, the resulting solution is cooled to 0°C. Then 31.0 g. of benzonitrile is added and after an additional 30 minutes water is added dropwise, and the organic layer is separated. The organic layer is washed twice with water, dried and then evaporated to yield a yellow oil of 1-benzimidoyl-2-isopropylamino-1-cycloheptene.

The yellow oil is dissolved in a mixture of 500 ml benzene and 60.0 g. triethylamine and the resulting solution is added dropwise to a prepared solution of 60 g. of phosgene in 1.2 liters benzene at 0°C. After 30 minutes the mixture is quenched with water, the organic layer is separated, then it is washed twice with water, dried and evaporated. The residue is recrystallized from ether to give 1-isopropyl-4-phenyl-1,5,6,7,8,9-hexahydrocyclohepta[d] pyrimidine-2-one. M.P. 155°-157°C.

Part B:

2-chloro-6,7,8,9-tetrahydro-4-phenyl-5H-cyclohepta[d]pyrimidine.

A mixture of 5.0 g. of 1-isopropyl-4-phenyl-1,5,6,7,8,9-hexahydrocyclohepta[d] pyrimidin-2-one and 15.0 g. of phosphorous oxychloride is boiled at reflux for 1.5 hours. The excess phosphorous oxychloride is then removed in vacuo and the residue is treated with ice-water. This mixture is then neutralized with sodium hydroxide and the organic material is then extracted with methylene chloride. The extracts are washed with water, dried and evaporated. The residue is recrystallized from methanol to yield 2-chloro-6,7,8,9-tetrahydro-4-phenyl-5H-cyclohepta[d]pyrimidine. (m.p. 119°C.)

Part C:

6,7,8,9-tetrahydro-2-(4'-methyl-1'-piperazyl)-4-phenyl-5H-cyclohepta[d]pyrimidine.

A mixture of 10.0 g. of 2-chloro-6,7,8,9-tetrahydro-4-phenyl-5H-cyclohepta[d]pyrimidine and 12.0 g. of N-methylpiperazine are boiled together with 50 ml of toluene for 1.25 hours. The total reaction mixture is then evaporated to dryness. The residue is then treated with boiling ethyl acetate. The excess N-methyl piperazinium chloride is filtered off and the filtrate is crystallized to give 6,7,8,9-tetrahydro-2-(4'-methyl-1'-piperazyl)-4-phenyl-5H-cyclohepta[d]pyrimidine, m.p. 80°-81°C.

The product 6,7,8,9-tetrahydro-2-(4'-methyl-1'-piperazyl)-4-phenyl-5H-cyclohepta[d]pyrimidine is an effective anti-inflammatory agent when orally administered to an animal suffering from inflammation at a dosage of from about 50 to 250 milligrams four times per day.

EXAMPLE 2

Following the above procedure of Parts A, B and C of example 1 and using an equivalent amount of cyclopentanone in place of cycloheptanone, there is obtained in Part A; 1-isopropyl-4-phenyl-1,5,6,7,tetrahydrocyclo penta[d] pyramidine-2-one (m.p. 155°-157°C); in Part B: 2-chloro-6,7-dihydro-4-phenyl-5H-cyclopenta[d]pyrimidine (m.p. 128°C); and in Part C: 6,7-dihydro-2-(4'-methyl-1'-piperazyl)-4-phenyl-5H-cyclopenta[d]pyrimidine.

EXAMPLE 3

Part A:

7-methyl-1-isopropyl-4-phenyl-5,6,7,8-tetrahydro-2(1H)-quinazolinone.

To a mixture of 112 g. 3-methyl cyclohexanone and 120 g. isopropylamine are added 100 g. Linde Type 3A molecular sieves. The mixture is allowed to stand overnight at room temperature, after which the sieves are removed by filtration and the excess of isopropylamine is removed in vacuo at room temperature. The oil residue is 1-methyl-N-(3-methyl cyclohexylidene)-ethylamine, b.p. 36° C. at 0.5 mm.

2.0 moles of n-butyl lithium (in a 1.6 N solution in hexane) are then added to a solution of 202 g. of diisopropylamine in 2 liters benzene. After 15 minutes 306 g. of 1-methyl-N-(3-methyl cyclohexylidene)-ethylamine are added while stirring. After a further 30 minutes, 206 g. of benzonitrile are added and the mixture stirred for 45 minutes, producing a solution of the lithium salt of 1-benzimidoyl-2-isopropylamino-4-methyl-1-cyclohexene. The reaction is then swamped with water and the organic layers washed 3 times with water. The organic layer is then dried and evaporated. The yellow oily residue is then distilled and 1-benzimidoyl-2-isopropylamine-4-methyl-1-cyclohexene collected at 155°C/0.7 mm.

A solution of 239 g. of 1-benzimidoyl-2-isopropylamino-4-methyl-1-cyclohexene and 172 g. triethylamine in 1 liter of toluene is added dropwise during 30 minutes to a solution of 170 g. phosgene in 2 liters toluene at 0°C. After stirring for 1 hour water is added and the resulting mixture worked up as in Example 1 part A to give 7-methyl-1-isopropyl-4-phenyl-5,6,7,8-tetrahydro-2(1H)-quinazolinone, m.p. 150–153°C.

Part B:
2-chloro-7-methyl-4-phenyl-5,6,7,8-tetrahydro-quinazoline

A mixture of 282 g. of 7-methyl-1-isopropyl-phenyl-5,6,7,8-tetrahydroquinazolin-2(1H)-one, and 459 g. of phosphorous oxychloride is boiled at reflux for 1.5 hours, during which time hydrogen chloride gas is evolved. The excess phosphorous oxychloride is removed in vacuo. The semi-solid residue is then treated with ic-water, and the aqueous phase neutralized with 50°C sodium hydroxide solution. The organic material is then extracted with methylene chloride, dried and evaporated. The residue is recrystallized from methanol to yield 2-chloro-7-methyl-4-phenyl-5,6,7,8-tetrahydro-quinazoline, m.p. 83°–85°C.

Part C:
2-amino-7-methyl-4-phenyl-5,6,7,8-tetrahydro-quinazoline

The 2-chloro-7-methyl-4-phenyl-5,6,7,8,-tetrahydro-quinazoline is dissolved in 20 ml dioxane and the solution is added to 50 ml liquid ammonia while stirring. After about two hours, the excess ammonia is allowed to evaporate and the residual solution evaporated. The residue is dissolved in methylene chloride and the solution is washed with water until all the ammonia is removed. The organic phase is then dried and evaporated. The residue is recrystallized from methanol to give 2-amino-7 -methyl-4-phenyl-5,6,7,8-tetrahydro-quinazoline.

EXAMPLE 4

Following essentially the procedure of Example 3, Part C, and utilizing, in place of ammonia the reactants, and the time and temperatures indicated in the table below:

| Reactant | Time | Temperature |
|---|---|---|
| a) Dimethylamine (under pressure) | 4 hours | 60° |
| b) Isopropylamine | 24 hours | reflux |
| c) Cyclohexylamine | 1 hours | reflux |
| d) Cyclopropylamine | 48 hours | reflux |

there is obtained a. 2-dimethylamino-7-methyl-4-phenyl-5,6,7,8-tetrahydro-quinazoline (m.p. 90°–95°C), b. 2-isopropylamino-7-methyl-4-phenyl-5,6,7,8-tetrahydro-quinazoline (m.p. 147°–150°C), c. 2-cyclohexylamino-7-methyl-4-phenyl-5,6,7,8-tetrahydro-quinazoline (m.p. 90°–92°C), or d. 2-cyclopropylamino-7-methyl-4-phenyl-5,6,7,8-tetrahydro-quinazoline, (m.p. 121°–123°C.), respectively.

What is claimed is:

1. A compound of the formula:

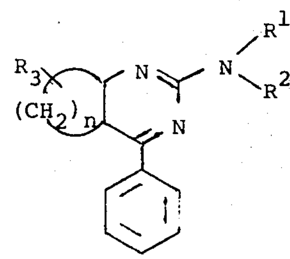

where $R^1$ and $R^2$ each represent hydrogen, alkyl of 1 to 4 carbon atoms or where $R^1$ is hydrogen $R^2$ may be cycloalkyl of 3 to 6 carbon atoms, or $R^1$ and $R^2$ together with N represent

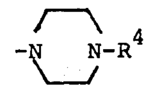

where $R^4$ represents alkyl of 1 to 4 carbon atoms;

$R^3$ represents hydrogen or alkyl of 1 to 4 carbon atoms and

*M* represents 3 or 5, or a pharmaceutically acceptable acid addition salt thereof.

2. The compound of claim 1 which is 6,7,8,9-tetrahydro-2-(4'-methyl-1'-piperazyl)-4-phenyl-5H-cyclohepta[d]pyrimidine.

3. The compound of claim 1 which is 6,7-dihydro-2-(4'-methyl-1'-piperazyl)-4-phenyl-5H-cyclopenta[d]pyrimidine.

4. The compound which is 2-chloro-6,7,8,9-tetrahydro-4-phenyl-5H-cyclohepta[d]pyrimidine.

5. The compound which is 2-chloro-6,7-dihydro-4-phenyl-5H-cyclopenta[d]pyrimidine.

* * * * *